United States Patent [19]

Parks

[11] Patent Number: 5,404,454
[45] Date of Patent: Apr. 4, 1995

[54] METHOD FOR INTERLEAVING COMPUTER DISK DATA INPUT-OUT TRANSFERS WITH PERMUTED BUFFER ADDRESSING

[75] Inventor: Terry J. Parks, Round Rock, Tex.

[73] Assignee: Dell USA, L.P., Austin, Tex.

[21] Appl. No.: 662,533

[22] Filed: Feb. 28, 1991

[51] Int. Cl.[6] .................... G06F 7/00; G06F 13/00
[52] U.S. Cl. ........................... 395/275; 364/240; 364/248.1; 364/DIG. 1
[58] Field of Search .............. 395/275, 800; 364/240, 364/248.1, DIG. 1

[56] References Cited

U.S. PATENT DOCUMENTS

| 4,479,179 | 10/1984 | Dinwiddie, Jr. | 364/DIG. 1 |
| 4,955,020 | 9/1990 | Stone et al. | 370/85.5 |
| 5,113,369 | 5/1992 | Kinoshita | 395/325 |
| 5,148,432 | 9/1992 | Gordon et al. | 371/10.1 |
| 5,202,979 | 4/1993 | Hillis | 395/575 |

OTHER PUBLICATIONS

A Case For Redundant Arrays of Inexpensive Disks (RAID) Patterson, et al. University of California Berkeley, Calif.

Primary Examiner—Alyssa H. Bowler
Assistant Examiner—John Harrity
Attorney, Agent, or Firm—James Hoffman; Paul Katz

[57] ABSTRACT

An apparatus and method for a computer system having at least two disk drives in a data storage system wherein data may be read from or written to the disk drives simultaneously during a load multiple operation. Data from the disk drives may be simultaneously loaded into two different memory buffers utilizing the maximum available I/O data bus bandwidth.

2 Claims, 2 Drawing Sheets

METHOD FOR INTERLEAVING COMPUTER DISK DATA INPUT-OUT TRANSFERS WITH PERMUTED BUFFER ADDRESSING

CROSS REFERENCE TO RELATED APPLICATIONS

| SERIAL NO. | TITLE | INVENTOR | FILING DATE |
|---|---|---|---|
| 628,505, now U.S. Pat. No. 5,359,611 | Method and Apparatus For Reducing Write Latency In Redundant Disk Arrays | Parks, et al. | 12/14/90 |
| 630,599, now U.S. Pat. No. 5,239,445 | Method and Apparatus For Simultaneous Operation of Two IDE Disk Drives | Parks, et al. | 12/20/90 |

The above listed applications are incorporated herein by reference.

BACKGROUND OF THE INVENTION

1. Field of the Invention

This invention relates generally to computer digital storage systems, and in particular to computer systems using a plurality of disk drives.

2. Description of the Related Technology

Personal computers have gained substantial popularity among individual users for both business and home use. Personal computers are now being utilized for jobs heretofore performed by mainframe computers and minicomputers. The rapidly growing popularity in the use of personal computers may, in part, be attributed to the substantial improvement in both its speed of operation and random access memory (RAM) capacity.

Presently, microcomputer processors may operate at 33 Mhz clock rates and utilize 32 bit data and address buses to access two to 256 megabytes of RAM. In general, RAM speed has kept pace with processor operational speeds, however, bulk data storage utilizing magnetic disks have not. To maintain computer system performance, larger main memories are being used to buffer frequent disk access requirements for data retrieval. This may be a solution for applications that will fit entirely in the main memory of the computer and for which memory volatility is not important. However, applications such as transaction-processing which have a high rate of random requests for small amounts of data or large simulations requiring massive amounts of data that are in excess of the main memory capacity require memory storage capacity only available by using disk storage technology.

Disk storage technology relies on the performance obtainable from mechanical devices. A disk storage device is comprised of a least one magnetic oxide coated platter and at least one read and write head. An electric motor is connected to a spindle that causes the platter to rotate at approximately 3600 RPM. The read/write head "floats" just above the surface of the disk platter oxide coating and moves back and forth across the face of the platter perpendicular to its rotational axis. The head moves predefined incremental distances called tracks. The disk platter is subdivided up into a number of tracks that form concentric imaginary circles on the platter face. Each track consists of a number of sectors that further divides the track into contiguously joined arcs forming a 360 degree circle. These sectors pass under the head as the disk platter rotates. A sector contains multiple bytes of data. A byte of data consists of eight bits binary information.

Data is stored as multiples of eight bit bytes in a disk sector. For example, a sector may contain 512 bytes of data, however, the sector may also contain more or less bytes depending on the disk system and its application. In those systems that utilize sectors of 512 bytes, if less than 512 bytes of data need be stored, then blank or dummy data is added to make up a full sector of data. If more than 512 bytes of data are stored then additional sectors are used.

Storage capacity of disk systems vary widely depending on platter size, number of platters, type of track and sector formatting and the precision of head position in mechanisms. Mass production of disk systems for personal computers have created low cost and high performance disks having data storage capacities of a hundred megabytes or more. Larger capacity disk systems, utilized in minicomputer and large mainframe computer systems, are typically several thousand megabytes or more. The cost per megabyte of a thousand megabyte disk is more than twice the cost per megabyte of the mass produced disks used in personal computers. Reliability is equivalent between either individual type of disk. However, power consumption and size are much lower per megabyte for the small disk systems.

In choosing a disk system for computer applications requiring thousands of megabytes of data storage one must evaluate two different approaches for implementation of a suitable disk system. The first and traditional approach utilizes one or more large capacity (thousands of megabytes) disks, the second utilizes a large number of smaller capacity disks. Redundant Arrays of Inexpensive Disks ("RAID"), based on magnetic disk technology developed for personal computers, offers an attractive alternative to the large capacity disks. RAID arrays offer improved performance, lower power consumption and lower incremental costs for additional capacity than do the large capacity disk systems.

A disk normally rotates at a speed of 3600 RPM. At this rotational speed the head passes over a particular sector every 16.67 milliseconds. Thus, the longest time required to align the head with the sector of interest would be less than or equal to 16.67 milliseconds. This delay is called rotational latency time. Data storage and retrieval latency time may be decreased by interleaving the read and write operations of a multiple disk system. Interleaving means that data is read from or written to alternate disks.

When interleaving data operations between multiple disks a first block of data is written to or read from disk A, a second block of data is handled by disk B, a third block of data is handled by disk C, a fourth block of data is handled by disk D, etc. After all data disks are so utilized, the interleaving cycle starts anew with the first disk A. Interleaving reduces the time required to transfer blocks of data because disk operations may be performed during the rotational latency times of the multiple disk system. For example, to write 10,240 bytes of data onto two disks, each disk having 512 byte sectors, would require the use of 10 sectors from each disk. The first block of data containing 512 bytes is written to or read from the first disk. The next block of data is written to or read from the second disk and subsequent blocks of data containing 512 bytes each are alternately transferred to/from each disk.

When data blocks in excess of 512 bytes are to be written to the disks, the disk controller may buffer an amount of data limited only by the amount of buffer or cache memory available in the controller. The disk controller writes this buffered data to the appropriate sectors of each disk. The controller must wait for the correct sectors to align with the write head before data can be transferred. When transferring data to a disk, a latency time of one revolution of the disk platter may result if the sector to be read or written has just passed the read/write head.

When using multiple disks in a disk storage system, synchronization of rotational speed and sector position may be accomplished by phase-lockedloop control which is well known in the art of disk systems. Phase-lockedloop control of the rotational speed and position allows rotational alignment for each of the corresponding sectors of the drives. Thus, sector 5 of disk 1 may be read or written at the same time as sector 5 of disk 2. Disk synchronization averages rotational latency to one half a revolution or 8.33 milliseconds instead of the possibility of a full revolution latency of 16.67 milliseconds.

However, even with interleaving of multiple disk operations and rotational synchronization, the disk system data transfer rates are abysmal compared to the computer system I/O bus data transfer capabilities. Disk controller systems have tried to increase the throughput rates of data transfers between the disks and RAM by utilizing cache RAM integral with the multi-disk controller to buffer blocks of data. The multi-disk controller reads the data in 16 bit words from the disks and may store this data in either 16 or 32 bit word buffer memory.

Current multi-disk controller technology utilizes 32 bit word cache memory buffers for data transfer to the computer system I/O data bus, however, the multi-disk controller processor logic only stores one 16 bit data word per read and write operation. In other words, the controller processor only loads 16 bits of data at a time from the disks and must use two read and write operations to load 32 bits of data into the cache memory buffer. The first read/write operation addresses the low 16 data bits of the cache memory address and the second read/write operation completes the high 16 bits of the 32 bit cache memory. Requiring two disk controller read/write operations per 32 bit data word may reduce in half potential data throughput. In transferring large blocks of data to the computer system RAM, this lost data throughput potential can be significant.

SUMMARY OF THE INVENTION

In contrast to prior methods and systems for reading data stored on multiple disk storage systems, the system and method of the present invention eliminates most of the double read and write operations required in the prior art disk systems. The system and method of the present invention overcomes the problems and limitations of the prior art by reading and writing disk data in 32 bit word increments and permuting the cache memory locations in which this data is written.

Present disk drive technology has integrated the drive electronics ("IDE") in with the drive itself (a Conner, type CP3204, in this preferred embodiment). Having the drive controller electronics integrated with the disk drive all as independent operation of each IDE drive during data transfer operations. The capability of the IDE drive to independently perform data transfer operations may be utilized, in an interleaved memory storage and retrieval system, to increase data transfer rates to the maximum available, limited only by multi-disk processor system data transfer bandwidth.

An IDE drive transfers data in sixteen bit words. An interleaved multi-disk system has at least two IDE drives that are synchronized in rotational speed and sector access positions. Each disk sector contains 512 eight bit bytes of data or 256 sixteen bit words of data. In the system and method of the present invention, the processor of the multi-disk controller reads 16 bit data words from at least two IDE drives simultaneously, thus, obtaining 32 bits of data on each read operation. The multi-disk processor then writes these 32 bit data words to its cache memory.

Reading data from at least two IDE disks simultaneously presents a problem of proper organization of the data to be written to the correct locations in cache memory. A sector of an IDE disk may contain 512 eight bit bytes, 256 sixteen bit short-words or 128 thirty-two bit long-words of contiguous data. Thus, logical storage of a disk's sector data would be in contiguous addresses of controller cache memory or system RAM. Normally, more than one disk sector may be read when transferring data from the disks to computer system RAM.

The system and method of the present invention solves the above data organization problem by permuting the address locations of the data written to cache or RAM memory. For example, disks A and B each have 256 sixteen bit words in each of their corresponding sectors. The desired result is to put each block of data contained in the corresponding sectors of disks A and B into separate contiguous blocks of cache memory (32 bit word) data buffers A and B respectively. This would result in buffer A containing 128 thirty-two bit words representative of the data contained in the sector of disk A and buffer B containing similar data from disk B.

The sixteen bit data buses of disks A and B are connected to the thirty-two bit I/O data bus of the multi-disk controller processor, for example, wherein the data buses of disks A and B connect to the lower and upper sixteen bits respectively of the controller processor I/O data bus. Thus, during a data transfer operation, data to/from disk A always passes on the lower sixteen bits and data for disk B on the upper sixteen bits of the controller I/O data bus.

Loading data from a disk to cache memory requires packing the sixteen bit data words ("short words") into the thirty-two bit data words ("long words") of the cache memory. Loading data from cache memory to disk is just the opposite, the long words must be unpacked into short words, however, the system and method of this invention are equally applicable to both reading and writing disk data.

Packing places the first short word from the disk into the lower half (lower sixteen bits) of the first long word of the cache memory and the second short word from the disk into the upper half of the first long word of cache memory. All subsequent short words are similarly packed in this manner, i.e. odd numbered short words go to the lower half of the respective cache memory long words and even numbered short words go to the upper half of the respective cache memory long words.

The system and method of the invention may utilize thirty-two bit words to read from or write to at least two, sixteen bit word, IDE disk drives simultaneously. Thus, from the above example, the first short data word from sector 1 of disk A appears on the lower half of the multi-disk controller I/O data bus and the first short word from sector 1 of disk B appears on the upper half of the controller I/O bus.

However, each sector 1 first short word from disks A and B must be written into the first long word lower half of cache buffers A and B respectively. This presents a slight problem of initializing the lower half of the first long word of cache B with the first short word from sector 1 of disk B. The controller of the invention solves this problem by first reading only the first short word from sector 1 of disk B and writing it into the lower half of the first long word of cache B by performing, for example, a rotate right 16 bit operation which effectively moves the first short word of disk B from the upper half of the controller I/O bus to the lower half of the controller I/O bus.

The multi-disk controller processor reads a thirty-two bit data word (long word) from its I/O data bus connected to at least two IDE disks and places the long word read into an internal thirty-two bit temporary register. From this internal temporary register, the controller processor may write long word data to cache memory or system RAM via the I/O data bus. The high and low halves of the long word contained in this temporary register may be interchanged so that a short word from IDE disk A may appear on the upper half and a short word from the IDE disk B may appear on the lower half of the I/O data bus during a write to cache memory operation.

The controller processor may bifurcate control of cache memory address selection. For example, the lower half of a cache memory long word address may be written to or read from at the same time that the upper half of a different cache memory long word address is being written to or read from. This bifurcated address selection and multiple short word data transfer is possible because of the flexible operation of the multi-disk controller microcomputer processor. Therefore, the controller processor may read two short words simultaneously, one each from disks A and B, on its long word I/O data bus into an internal long word temporary register. Data contained in this temporary register may be written as two short words simultaneously into different cache memory address locations by placing either of the two different short words into the low half of one selected address location and the high half into the other selected address location. The above functions are called permuted buffer addressing.

The system and method of the present invention aliases the data from the disks into three different address spaces: (1) normal addressing, (2) permuted high addressing and (3) permuted low addressing. Normal addressing does not modify the position of the high and low halves of the long words of data on the I/O bus and does not modify the cache memory address locations accessed.

Permuted high addressing applies the data read from disk A, contained in the low half of the temporary register, to the low half of the I/O data bus and writes the disk A short word into the low half (lower 16 bits) of the cache memory address (buffer A) location; and at the same time, applies the data read from disk B, contained in the high half of the temporary register, to the high half of the I/O data bus and writes the disk B short word into the high half (upper 16 bits) of the cache memory location offset from this address by 512 byte addresses (buffer B).

Permuted low addressing applies the data read from disk A, contained in the low half of the temporary register, to the high half of the I/O data bus and writes the disk A short word into the high half (upper 16 bits) of the cache memory address (buffer A) location; and at the same time, applies the data read from disk B, contained in the high half of the temporary register, to the low half of the I/O data bus and writes the disk B short word into the low half (lower 16 bits) of the cache memory location offset from this address by 512 byte addresses (buffer B).

Memory address space may be thought of as data organized in byte (8 bits), short word (16 bits) and long word (32 bits) increments. A short word comprises two bytes—high and low and a long word comprises two short words—high and low. The controller or system processor may select the address for any byte, short word or long word by enabling the appropriate address lines of the I/O address bus. Byte selection is determined by the least significant address bit and short word selection by the next to least significant address bit.

The system and method of the present invention controls the short word address bit in conjunction with the overall address selection to perform the bifurcated data transfer from the IDE disks to the individual cache memory buffers. As an example, data is loaded from the IDE drives to the cache memory buffers by first reading the first short word from sector 1 of IDE drive B and storing it in the lower half of the first memory address location of buffer B. This operation is a sixteen bit data transfer that sets up the proper sequence for further simultaneous thirty-two bit data transfers to buffers A and B.

The second data transfer from disks A and B, which is thirty-two bits, is a permuted high address operation wherein the first short word from sector 1 of IDE drive A is stored in the low half of the first address location of buffer A and the second short word from sector 1 of IDE drive B is stored in the high half of the first memory address location of buffer B which is 512 address bytes above the respective buffer A address location.

The third data transfer from disks A and B, which is also thirty-two bits, is a permuted low address operation wherein the second short word from sector 1 of IDE drive A is stored in the high half of the first address location of buffer A and the third short word from sector 1 of IDE drive B is stored in the low half of the second memory address location of buffer B.

The fourth data transfer from disks A and B is a permuted high address operation wherein the third short word from sector 1 of IDE drive A is stored in the low half of the second address location of buffer A and the fourth short word from sector 1 of IDE drive B is stored in the high half of the third memory address location of buffer B.

These data transfers continue in alternating permuted high and low operations including the next to the last data transfer from disks A and B which is a permuted high address operation wherein the next to the last short word from sector 1 of IDE drive A is stored in the low half of the last address location of buffer A and the last short word from sector 1 of IDE drive B is stored in the high half of the last memory address location of buffer B.

The final data transfer occurs when the processor loads the last short word from sector 1 of IDE drive A into the high half of the last memory address location of buffer A. This completes the operational sequence of loading both cache memory buffers with data from sector 1 of both IDE drives. Those skilled in the art may readily appreciate that data from a plurality of sectors and a plurality of disks may be read from or written to without deviating from the spirit and intent of this invention.

The above described example is applicable to I/O addressing operations of a processor which is capable of load multiple instructions such as the Intel 80960. The Intel 80960 processor when used in conjunction with burst bus chip select and wait state circuitry may initiate access of all IDE drives during a load multiple instruction. However, when using the load multiple instruction, the data bus only waits for the first disk drive access, subsequent drive accesses in the same burst or load multiple access will complete in fewer or no wait states because the drives have already been accessed and the buffer select logic has only to enable their data buffers to place the requested data onto the system I/O data bus.

An object of the present invention is a system and method to read from and write to a plurality of interleaved I/O devices at the maximum available computer system I/O data bus bandwidth.

Another object of the present invention is to provide a means for arranging the addressing such that a load multiple type instruction can read data from all I/O devices in parallel with zero wait state accesses on all but the first access.

Still another object of the present invention is to provide for two or more narrower data width I/O devices across a wide processor data I/O bus so that all of the narrow data width I/O devices may be accessed simultaneously.

A further object of the present invention is to provide a means for permuting buffer addressing such that a single write operation can send the low half of the system data bus to one buffer and the high half of the data bus to another buffer or visa-versa.

Those skilled in the art of computers will readily realize the application of the method and system of the present invention to data transfers associated with high speed communications networks, data acquisition and control systems and other applications requiring the transfer of large quantities data through the computer system I/O bus.

Other and further objects, features and advantages will be apparent from the following description of the preferred embodiment of the invention, given for the purpose of disclosure and taken in conjunction with the accompanying drawings.

DETAILED DESCRIPTION OF THE PREFERRED EMBODIMENT

Figure 1:
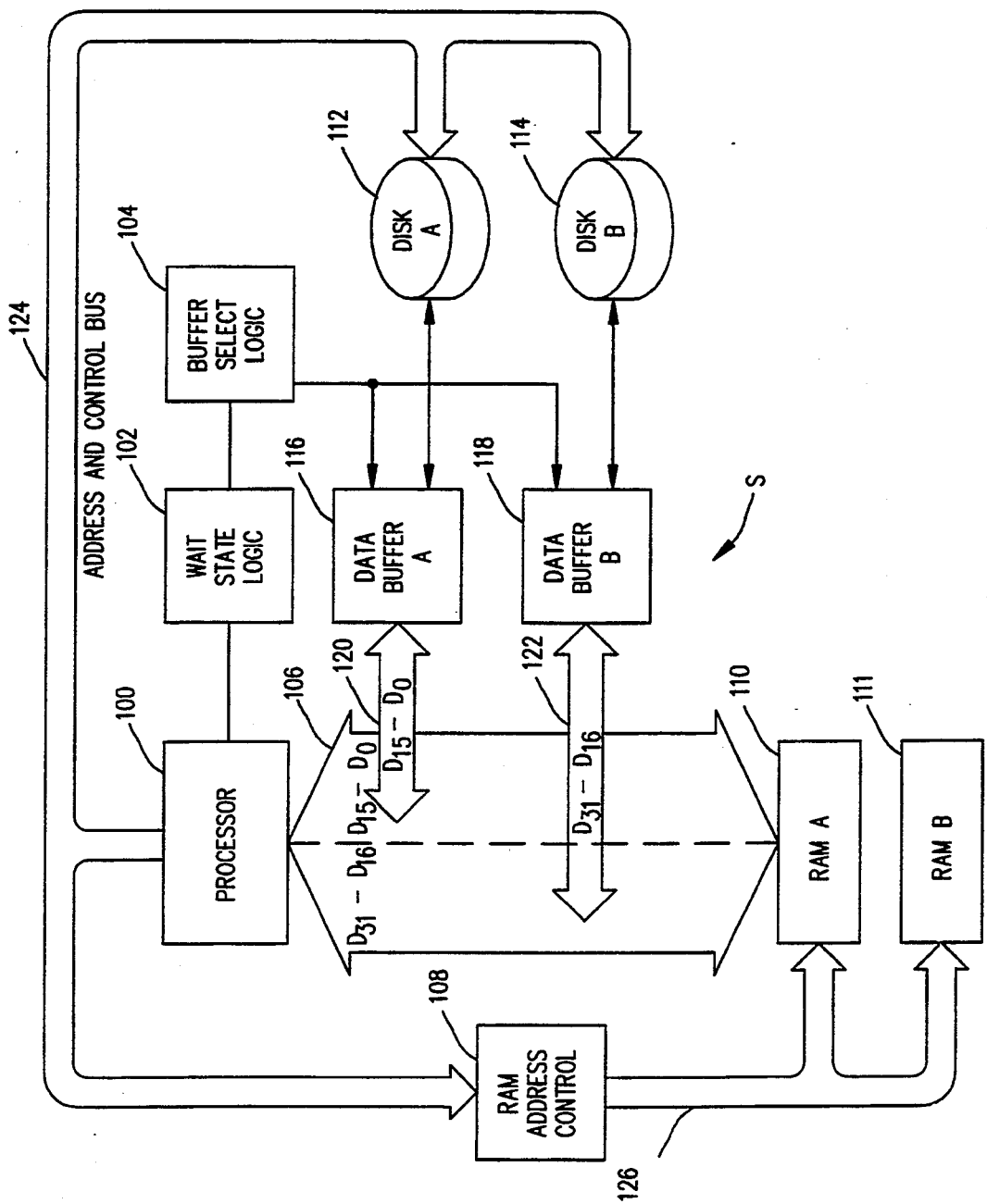
FIG. 1 is a block diagram of a preferred embodiment of the invention.

Referring now to the drawings, the details of the preferred embodiment are illustrated. In the drawings the letter S designates generally a permuted buffer addressing multi-disk system of the invention. Referring now to FIG. 1, permuted buffer addressing system S comprises a processor 100, wait state logic 102, (Intel type 856960 in this preferred embodiment) buffer select logic 104, processor I/O data bus 106, RAM address control 108, RAM A 110, RAM B 111, disk A 112, disk B 114, data buffer A 116, data buffer B 118, buffer A data bus 120, buffer B data bus 122, processor address and control bus 124, and RAM address control bus 126.

The processor 100 may have a 32 bit or 16 bit data bus. The I/O data bus 106 illustrated in FIG. 1 is 32 bits wide and is represented by data line designations of $D_{31}$–$D_0$. The processor 100 controls disk A 112 and disk B 114 through address and control bus 124. The disks 112 and 114 are, for example, IDE drives having integral controller electronics associated with the disk drive and a sixteen bit input-output ("I/O") data bus.

Disks 112 and 114 connect to data buffers 116 and 118, respectively. Data buffer 116 connects to the I/O data bus 106 data lines $D_{15}$–$D_0$ and data buffer 118 connects to data lines $D_{31}$–$D_{16}$. This arrangement places all data transfers associated with the disk A 112 on the lower sixteen data lines of I/O data bus 106 and data transfers associated with disk B 114 on the upper sixteen data lines. The buffer select logic 104 (well known I/O decoder) controls the data buffers 116 and 118 by enabling the appropriate buffer when the processor 100 transfers the data contained therein to RAMs 110 and 111.

RAMs 110 and 111 may be part of the computer system main memory or may be dedicated memory buffers incorporated in a multi-disk controller system. The contents of RAMs 110 and 111 may be addressed in eight bit bytes, sixteen bit short words or thirty-two bit long words. Addressing may be of any size consistent with the address bus architecture of the processor 100, however, for example only, the ten least significant (ten lowest order) address bits will be referenced. These address bits correspond to address lines $A_9$–$A_0$.

Figures 2A, 2B:
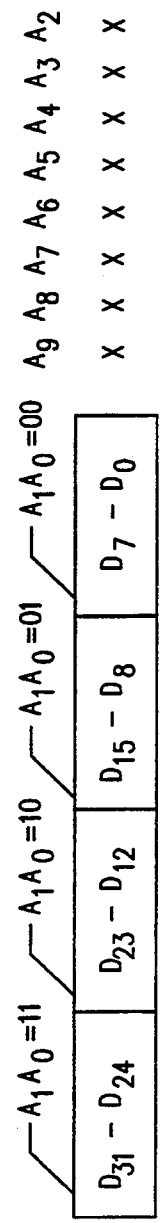
FIGS. 2a and 2b are schematic diagrams of a memory address location depicting data contained therein.

Referring now to FIGS. 2a and 2b, schematic representations of one long word of random access memory are illustrated. RAMs 110 and 111 connect to I/O data bus 106 which is thirty-two bits wide. Thus, the data bus 106 may transfer thirty-two bits of data simultaneously to an address location of either RAM 110 or RAM 111. However, the system and method of the present invention utilize independent address lines $A_1$ and $A_8$ to each of RAMs 110 and 111 and common address lines $A_0$, $A_2$–$A_7$ and $A_9$ for both RAMs. Independent address lines $A_1$ and $A_8$ are controlled by the RAM address control 108 (a PAL in this preferred embodiment, configured to provide addressing as shown in FIG. 2) and connect, along with the other common address lines, to RAMs 110 and 111 by means of address control bus 126. Therefore, the invention allows simultaneous transfer of sixteen bits of data on data lines $D_{31}$–$D_{16}$ to the upper sixteen bits of an address location of RAM 111 and sixteen bits of data on data lines $D_{15}$–$D_0$ to the lower sixteen bits of an address location of RAM 110, or vise-versa.

Address line $A_8$ is replicated to both RAMs 110 and 111 so that an automatic address offset of 512 bytes occur during a simultaneous data transfer to address locations of both RAMs 110 and 111. Address line $A_1$ also is replicated to both RAMs 110 and 111 so that RAM control 108 may select whether the low short word of RAM 110 and high short word of RAM 111 of the selected and offset address locations, respectively, will receive data from the data bus 106 or visa-versa.

Disks 112 and 114 transfer data in sixteen bit words. An interleaved multi-disk system, as illustrated in FIG. 1, has at least two IDE drives that are synchronized in rotational speed and sector access positions. Each disk sector contains 512 eight bit bytes of data or 256 sixteen bit words of data. In the system and method of the present invention, the processor 100 reads two 16 bit data words from data buffers 116 and 118 via data bus 106. The thirty-two bits of data read are representative of the sixteen bits of data from each of disks 112 and 114. Thus, by the processor 100 reading 32 bits of data from data bus 106, data from both disks 112 and 114 are read simultaneously. The processor then writes this 32 bit data word to RAMs 110 and 111.

However, reading data from both disks 112 and 114 simultaneously, via data buffers 116 and 118 respectively, presents a problem of proper organization of the data to be written to the required locations in cache memory RAMs 110 and 111. A sector of an IDE disk may contain 512 eight bit bytes, 256 sixteen bit short-words or 128 thirty-two bit long-words of contiguous data. Thus, logical storage of a disk's sector data would be in contiguous addresses of cache memory or system RAM. Normally, more than one disk sector may be read when transferring data from the disks 112 and 114 to RAMs 110 and 111.

The system and method of the present invention solves the above data organization problem by permuting the address locations of the data written to cache or RAM memory. For example, disks 112 and 114 each have 256 sixteen bit words in each of their corresponding sectors. The desired result is to put each block of data contained in the corresponding sectors of disks 112 and 114 into separate contiguous blocks of cache memory (32 bit word) data buffers RAMs 110 and 111 respectively. This wour result in RAM 110 containing 128 thirty-two bit words representative of the data contained in the sector of disk 112 and RAM 114 containing similar data from disk 114.

The sixteen bit data buses of disks 112 and 114 are connected to the thirty-two bit I/O data bus 106 of the processor 100, for example, wherein the data buffers 116 and 118 connect to the lower and upper sixteen bits respectively of the I/O data bus 106. Thus, during a data transfer operation, data to/from disk 112 always passes on the lower sixteen bits and data from disk 114 on the upper sixteen bits of the I/O data bus 106.

Loading dam from a disk to cache memory requires packing the sixteen bit data words ("short words") into the thirty-two bit data words ("long words") of the cache memory. Loading data from cache memory to disk is just the opposite, the long words must be unpacked into short words, however, the system and method of this invention are equally applicable to both reading and writing disk data.

Packing places the first short word (odd) from the disk into the lower half (lower sixteen bits) of the first long word of the cache memory and the second short word (even) from the disk into the upper half of the first long word of cache memory. All subsequent short words are similarly packed in this manner, i.e. odd numbered short words go to the lower half of the respective cache memory long words and even numbered short words go to the upper half of the respective cache memory long words.

The system and method of the invention may utilize thirty-two bit words to read from or write to at least two, sixteen bit word, IDE disk drives simultaneously. Thus, from the above example, the first short data word from sector 1 of disk 112 appears on the lower half ($D_{15}$–$D_0$) of the I/O data bus 106 and the first short word from sector 1 of disk 114 appears on the upper half ($D_{31}$–$D_{16}$) of the bus 106.

However, each sector 1 first short word from disks 112 and 114 must be written into the first long word lower half of RAMs 110 and 111 respectively. This presents a slight problem of initializing the lower half of the first long word of RAM 111 with the first short word from sector 1 of disk 114. The system and method of this invention involves this problem by first reading only the first short word from sector 1 of disk 112 and writing it into the lower half of the first long word of RAM 111 by performing, for example, a rotate right 16 bit operation which effectively moves the first short word of disk 114 from the upper half of the I/O data bus 106 to the lower half.

The processor 100 reads a thirty-two bit data word (long word) from the I/O data bus 106 and places the long word read into an internal thirty-two bit temporary register. From this internal temporary register, the processor 100 may write long word data to cache memory or system RAMs 110 and 111 via the I/O data bus 106. The high and low halves of the long word contained in this temporary register may be interchanged so that a short word from disk 112 may appear on the upper half ($D_{31}$–$D_{16}$) and a short word from disk 114 may appear on the lower half ($D_{15}$–$D_0$) of the I/O data bus 106 when writing to RAMs 110 and 111.

The system and method of the invention bifurcates address selection of RAMs 110 and 111. For example, the lower half ($D_{15}$–$D_0$) of a RAM 110 long word address location may be written to or read from at the same time that the upper half ($D_{31}$–$D_{16}$) of a RAM 111 long word address location is being written to or read from. This bifurcated address selection and multiple short word data transfer is possible by using independent address lines $A_8$ and $A_1$ for address control of each of RAMs 110 and 111. RAM address control 108 selects the appropriate independent and common address lines for proper address permutation when writing or reading the data from disks 112 and 114.

Therefore, the processor 100 reads two short words simultaneously, one each from data buffers 116 and 118 respectively, on I/O data bus 106 into an internal long word temporary register that is part of processor 100. Data contained in this temporary register may be written as two short words simultaneously into different RAM address locations by placing either of the two different short words into the low half of one selected address location and the high half into the other selected address location. The above functions are called permuted buffer addressing.

The system and method of the present invention aliases the data from the disks into three different address spaces: (1) normal addressing, (2) permuted high addressing and (3) permuted low addressing. Normal addressing does not modify the position of the high and low halves of the long words of data on the I/O bus 106 and does not modify the RAM 110 and 111 address locations accessed.

Permuted high addressing applies the data from disk 112, contained in the low half of the temporary register of processor 100, to the low half ($D_{15}$–$D_0$) of the I/O data bus 106 and writes the disk 112 short word into the low half ($D_{15}$–$D_0$) of a RAM 110 memory address location; and at the same time, applies the data from disk 114, contained in the high half of the temporary register to the high half ($D_{31}$–$D_{16}$) of the I/O data bus 106 and writes the disk 114 short word into the high half ($D_{31}$–$D_{16}$) of a RAM 111 memory location offset from the above RAM 110 address location by 512 bytes.

Permuted low addressing applies the data from disk 112, contained in the low half of the temporary register of processor 100, to the high half ($D_{31}$–$D_{16}$) the I/O data bus 106 and writes the disk 112 short word into the high half ($D_{31}$–$D_{16}$) of a RAM 110 memory address location; and at the same time, applies the data from disk 114, contained in the high half of the temporary register, to the low half ($D_{15}$–$D_0$) of the I/O data bus 106 and writes the disk 114 short word into the low half ($D_{15}$–$D_0$) of a RAM 111 first address location offset from the above RAM 110 first address location by 512 bytes.

The system and method of the present invention independently controls address lines $A_1$ and $A_8$ in conjunction with the overall address selection to perform the bifurcated data transfer from the disks 112 and 114 to the individual cache memory buffers, RAMs 110 and 111 respectively. As an example, data is loaded from the disks 112 and 114 to the RAMs 110 and 111 by first reading the first short word from sector 1 of disk 114 and storing it in the lower half of the first memory address location of RAM 111. This operation is a sixteen bit data transfer that sets up the proper sequence for further simultaneous thirty-two bit data transfers to RAMs 110 and 111.

The second data transfer from disks 112 and 114, which is thirty-two bits, is a permuted high address operation wherein the first short word from sector 1 of disk 112 is stored in the low half of the first address location of RAM 110 and the second short word from sector 1 of disk 114 is stored in the high half of the first address location of RAM 111 which is 512 address bytes above the respective RAM 110 address location.

The third data transfer from disks 112 and 114, which is also thirty-two bits, is a permuted low address operation wherein the second short word from sector 1 of the disk 112 is stored in the high half of the first address location of RAM 110 and the third short word from sector 1 of disk 114 is stored in the low half of the second memory address location of RAM 111 which is 512 address bytes above the respective RAM 110 address location.

The fourth data transfer from disks 112 and 114 is a permuted high address operation wherein the third short word from sector 1 of disk 112 is stored in the low half of the second address location of RAM 110 and the fourth short word from sector 1 of disk 114 is stored in the high half of the third memory address location of RAM 110 which is 512 address bytes above the respective RAM 110 address location.

These data transfers continue in alternating permuted high and low operations including the next to the last data transfer from disks 112 and 114 which is a permuted high address operation wherein the next to the last short word from sector 1 of disk 112 is stored in the low half of the last address location of RAM 110 and the last short word from sector 1 disk 114 is stored in the high half of the last memory address location of RAM 111.

The final data transfer occurs when the processor loads the last short word from sector 1 disk 112 into the high half of the last memory address location of RAM 110. This completes the operational sequence of loading both cache memory buffers, RAMs 110 and 111, with data from sector 1 of both disks 112 and 114. Those skilled in the art may readily appreciate that data from a plurality of sectors and a plurality of disks may be read from or written to without deviating from the spirit and intent of this invention.

The above described example is applicable to I/O addressing operations of a processor which is capable of load multiple instructions such as the Intel 80960. The Intel 80960 processor when used in conjunction with burst bus chip select and wait state circuitry may initiate access of all IDE drives during a load multiple instruction. However, when using the load multiple instruction, the data bus only waits for the first disk drive access by means of wait stpre logic 102, subsequent drive accesses in the same burst or load multiple access will complete in fewer or no wait states because the disks 112 and 114 have already been accessed and the buffer select logic 104 has only to enable the data buffers 116 and 118 to place the requested data onto the system I/O data bus 106.

Those skilled in the art of computers will readily realize the application of the method and system of the present invention to data transfers associated with high speed communications networks, data acquisition and control systems and other applications requiring the transfer of large quantities data through a computer system I/O bus.

The system and method of the present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will readily suggest themselves to those skilled in the art and which are encompassed within the spirit of the invention and the scope of the appended claims.

What is claimed is:

1. In a computer system including a processor having select logic, data and address I/O bus, random access memory (RAM), provisions for the attachment of one or more peripheral devices into the system data and address I/O bus, and an I/O subsystem for increasing utilization of the computer system I/O bandwidth during data transfers with the peripheral devices, said I/O subsystem comprising;

address and control buses, buffer select and address control logic; and at least two I/O devices each having data buffers, said I/O devices and data buffers connected to said processor I/O buses and transferring data when requested by said processor select logic, said buffer select logic connected to enable said I/O device data buffers for transfer of data between said I/O device buffers and I/O data bus, wherein the data buffer of the first of said I/O devices is connected to a lower portion of said processor I/O data bus and the data buffer of the second said I/O devices is connected to an upper portion of said processor I/O data bus; and wherein the address control logic includes circuitry for permuting the selected address locations of said random access memory during data transfers between said I/O device data buffers and random access memory; and wherein said address control logic comprises:
      means for writing a first data short word from said second I/O device to said random access memory low half word at a first address offset by a fixed value; — means for simultaneously writing a first data short word from said first I/O device to said random access memory low half word at the first address and a second data short word from said second I/O device to said random access memory high half word at the first address offset by the fixed value;

means for simultaneously writing the next short word from said first and second I/O devices to said random access memory high half word at the first address and low half word at the next address offset by the fixed value, respectively;

means for simultaneously writing subsequent short words from said first and second I/O devices to said random access memory low and high half words alternately at subsequent addresses for data from said first I/O device and at subsequent addresses offset by the fixed value for data from said second I/O device; and means for writing a last short word from said first I/O device to said random access memory high half word at a last address.

2. A method for a computer system including a processor, data and address I/O bus, random access memory (RAM), provisions for the attachment of one or more peripheral devices into the system data and address I/O bus, wherein a processing means increases utilization of the computer system I/O bandwidth during data transfers with the peripheral devices, said method comprising the steps of:

writing a first data short word from a second I/O device to a random access memory low half word at a first address offset by a fixed value;

simultaneously writing a first data short word from a first I/O device to said random access memory low half word at the first address and a second data short word from said second I/O device to said random access memory high half word at the first address offset by the fixed value;

simultaneously writing the next short words from said first and second I/O devices to said random access memory high half word at the first address and low half word at the next address offset by the fixed value, respectively;

simultaneously writing subsequent short words from said first and second I/O devices to said random access memory low and high half words alternately at subsequent addresses for data from said first I/O device and at subsequent addresses offset by the fixed value for data from said second I/O device; and writing a last short word from said first I/O device to said random access memory high half word at a last address.

* * * * *